US011976800B1

(12) United States Patent
Kaski et al.

(10) Patent No.: US 11,976,800 B1
(45) Date of Patent: May 7, 2024

(54) VEHICLE LIGHTING ASSEMBLY WITH LIGHT BLADE AND LIGHTING METHOD

(71) Applicant: Ford Global Technologies, LLC, Dearborn, MI (US)

(72) Inventors: Mark Kaski, Royal Oak, MI (US); Omar Benjamin Lara Monarrez, Canton, MI (US); Derek English, Detroit, MI (US); Brandon Schwandt, Madison Heights, MI (US); Linsheng Chen, Novi, MI (US); Dean Carbis, Bloomfield Hills, MI (US); Robert Todd Laster, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/163,366

(22) Filed: Feb. 2, 2023

(51) Int. Cl.
*F21S 2/00* (2016.01)
*F21S 43/20* (2018.01)
*F21S 43/241* (2018.01)

(52) U.S. Cl.
CPC ............ *F21S 43/241* (2018.01); *F21S 43/26* (2018.01)

(58) Field of Classification Search
CPC ...... F21S 43/241; F21S 43/235; F21S 43/236; F21S 43/237; F21S 43/239; F21S 43/251; F21S 43/255
See application file for complete search history.

(56) References Cited

U.S. PATENT DOCUMENTS

| 7,905,639 | B2 | 3/2011 | Luo et al. |
| 7,946,743 | B2 | 5/2011 | Natsume et al. |
| 10,724,729 | B2 * | 7/2020 | Williams ............... F21S 41/147 |
| 2012/0033441 | A1 * | 2/2012 | Sousek .................... F21S 43/14 362/555 |
| 2019/0368678 | A1 | 12/2019 | Thombre |

FOREIGN PATENT DOCUMENTS

| DE | 202013105487 U1 | 5/2014 |
| WO | WO-2023072988 A1 * | 5/2023 |

\* cited by examiner

*Primary Examiner* — Robert J May
(74) *Attorney, Agent, or Firm* — Vichit Chea; Carlson, Gaskey & Olds, P.C.

(57) ABSTRACT

A vehicle lighting assembly includes a light housing, a lens, a light source within a cavity provided by the light housing and the lens, and a light blade projecting from the lens outside the cavity. A vehicle lighting method includes emitting light from a light source that is inside a cavity provided by a light housing and a lens, and directing the light through a light blade that is outside the cavity.

18 Claims, 3 Drawing Sheets

VEHICLE LIGHTING ASSEMBLY WITH LIGHT BLADE AND LIGHTING METHOD

TECHNICAL FIELD

This disclosure relates generally to a lighting assembly for a vehicle and, more particularly, to a lighting assembly incorporating a light blade.

BACKGROUND

Vehicles include various types of lighting assemblies. Some lighting assemblies include a lens covering a light source. The lighting assemblies are illuminated when light from the light source moves from the lamp assembly through the lens. Lighting assemblies can include headlamps, tail lamps, side markers, etc.

SUMMARY

In some aspects, the techniques described herein relate to a vehicle lighting assembly, including: a light housing; a lens; a light source within a cavity provided by the light housing and the lens; and a light blade projecting from the lens outside the cavity.

In some aspects, the techniques described herein relate to a vehicle lighting assembly, wherein the light blade is mechanically fastened to the lens.

In some aspects, the techniques described herein relate to a vehicle lighting assembly, wherein a least a portion of the light blade is received within a recessed area of the lens.

In some aspects, the techniques described herein relate to a vehicle lighting assembly, wherein cavity is a sealed cavity.

In some aspects, the techniques described herein relate to a vehicle lighting assembly, wherein the light blade is a first light blade, and further including a second light blade projecting from the lens outside the cavity.

In some aspects, the techniques described herein relate to a vehicle lighting assembly, wherein the first light blade and the second light blade are different colors.

In some aspects, the techniques described herein relate to a vehicle lighting assembly, wherein the light source is a first light source configured to emit light into the first light blade, and further including a second light source within the cavity, the second light source configured to emit light into the second light blade.

In some aspects, the techniques described herein relate to a vehicle lighting assembly, further including a light blocking bezel within the cavity, the light blocking bezel configured to block light emitted from the first light source from moving to the second light blade, the light blocking bezel configured to block light emitted from the second light source from moving to the first light blade.

In some aspects, the techniques described herein relate to a vehicle lighting assembly, wherein the light blade includes a textured region.

In some aspects, the techniques described herein relate to a vehicle lighting assembly, wherein the lens is a first lens, and further including a second lens that covers at least the textured region.

In some aspects, the techniques described herein relate to a vehicle lighting assembly, wherein at least a portion of the light blade is exposed and uncovered by any lens.

In some aspects, the techniques described herein relate to a vehicle lighting assembly, further including a collimator within the cavity, the collimator configured to redirect light from the light source to the light blade.

In some aspects, the techniques described herein relate to a vehicle lighting assembly, wherein the light housing, the light source, and the lens are constituents of a rear taillight assembly of a vehicle, wherein the light blade projects rearward from the lens relative to an orientation of the vehicle.

In some aspects, the techniques described herein relate to a vehicle lighting assembly, wherein the light source is an exchangeable Light Emitting Diode module.

In some aspects, the techniques described herein relate to a vehicle lighting assembly, wherein the light blade includes a vertically extending portion and a horizontally extending portion.

In some aspects, the techniques described herein relate to a vehicle lighting method, including: emitting light from a light source that is inside a cavity provided by a light housing and a lens; and directing the light through a light blade that is outside the cavity.

In some aspects, the techniques described herein relate to a vehicle lighting method, wherein the light blade is removably attached to the lens.

In some aspects, the techniques described herein relate to a vehicle lighting method, further including emitting light from the light blade through a textured region of the light blade.

In some aspects, the techniques described herein relate to a vehicle lighting method, wherein the light blade extends horizontally from the lens, wherein the light blade includes a vertically extending portion and a horizontally extending portion.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure relates generally to a lighting assembly for a vehicle and, in particular, a lighting assembly having a light blade secured to a lens.

Figure 1:
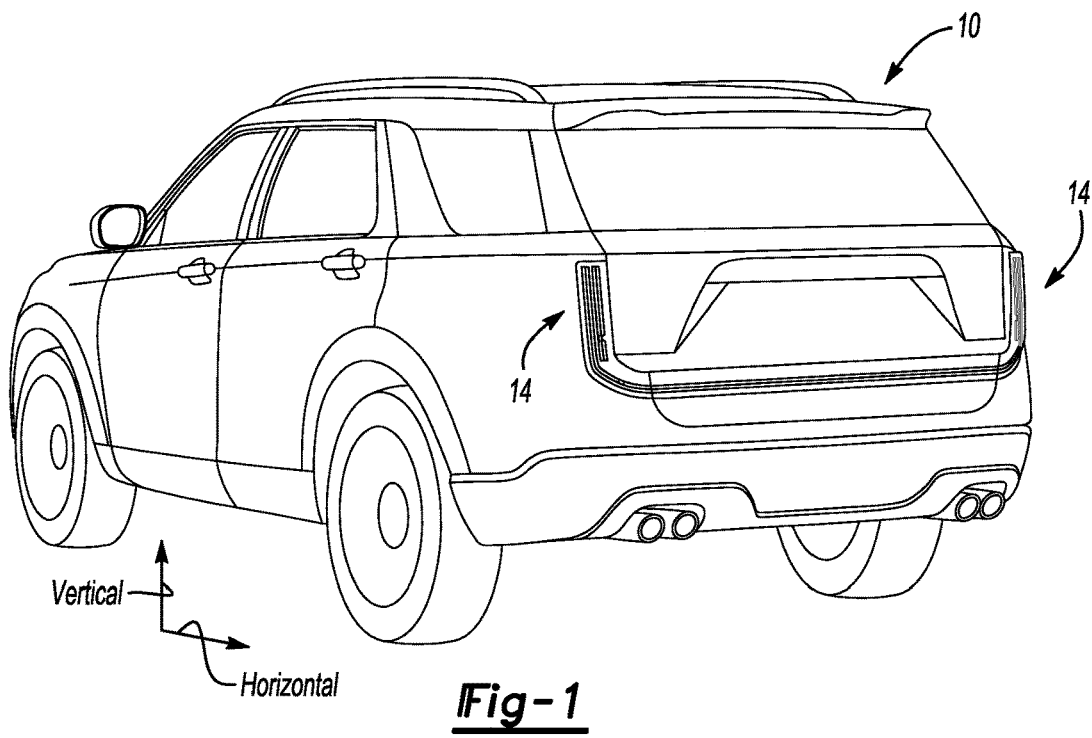
FIG. 1 illustrates a rear view of a portion of a vehicle incorporating lighting assemblies according to an exemplary embodiment of the present disclosure.

With reference to FIG. 1, a vehicle 10 includes at least one lighting assembly 14. In this example, the at least one lighting assembly 14 is a rear taillight assembly of the vehicle 10. Although the example lighting assembly 14 is a taillight, the teachings of this disclosure apply to other types of lighting assemblies, including other vehicle lighting assemblies such as headlights and interior lights.

Figure 2:
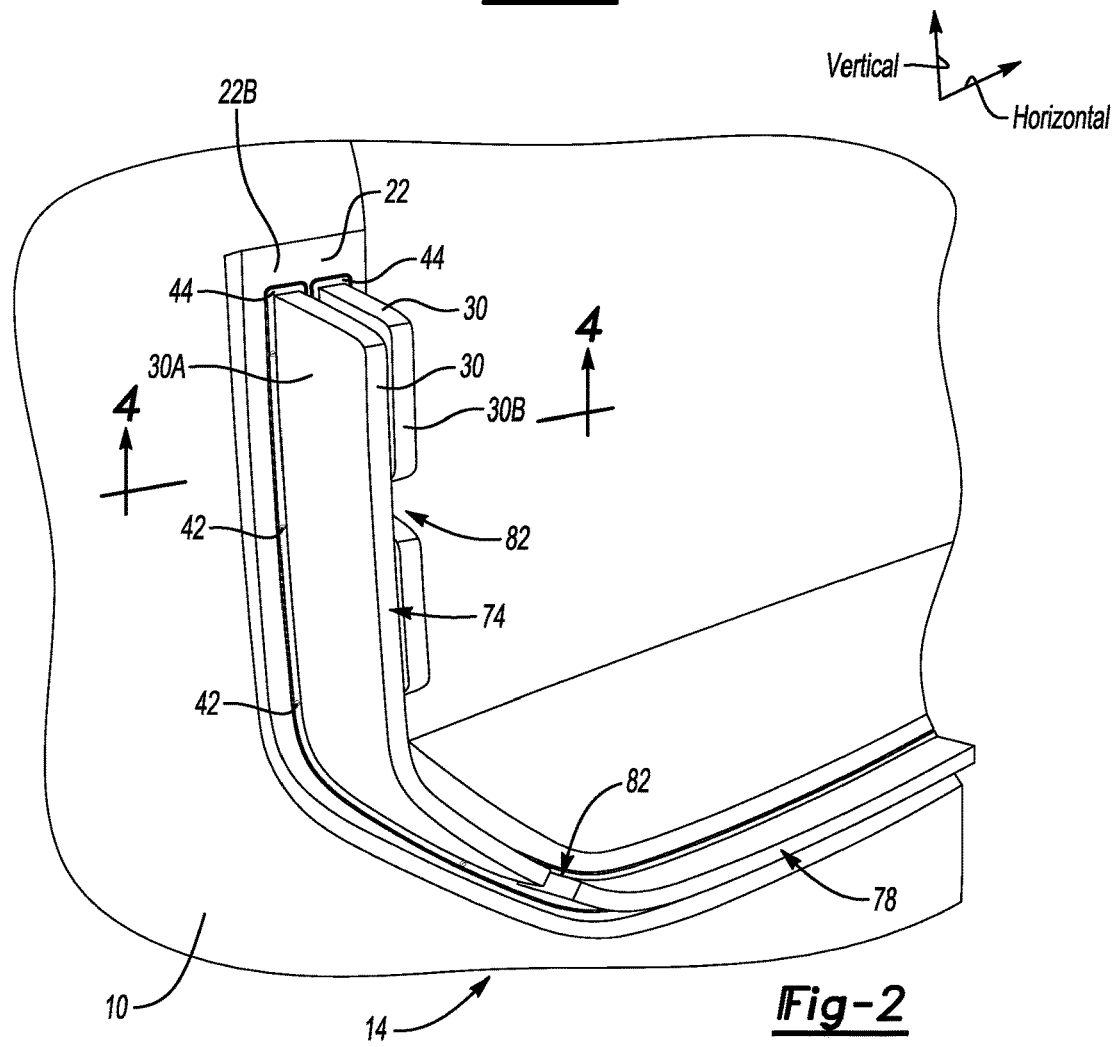
FIG. 2 illustrates a closeup view of a lighting assembly from FIG. 1.
Figure 3:
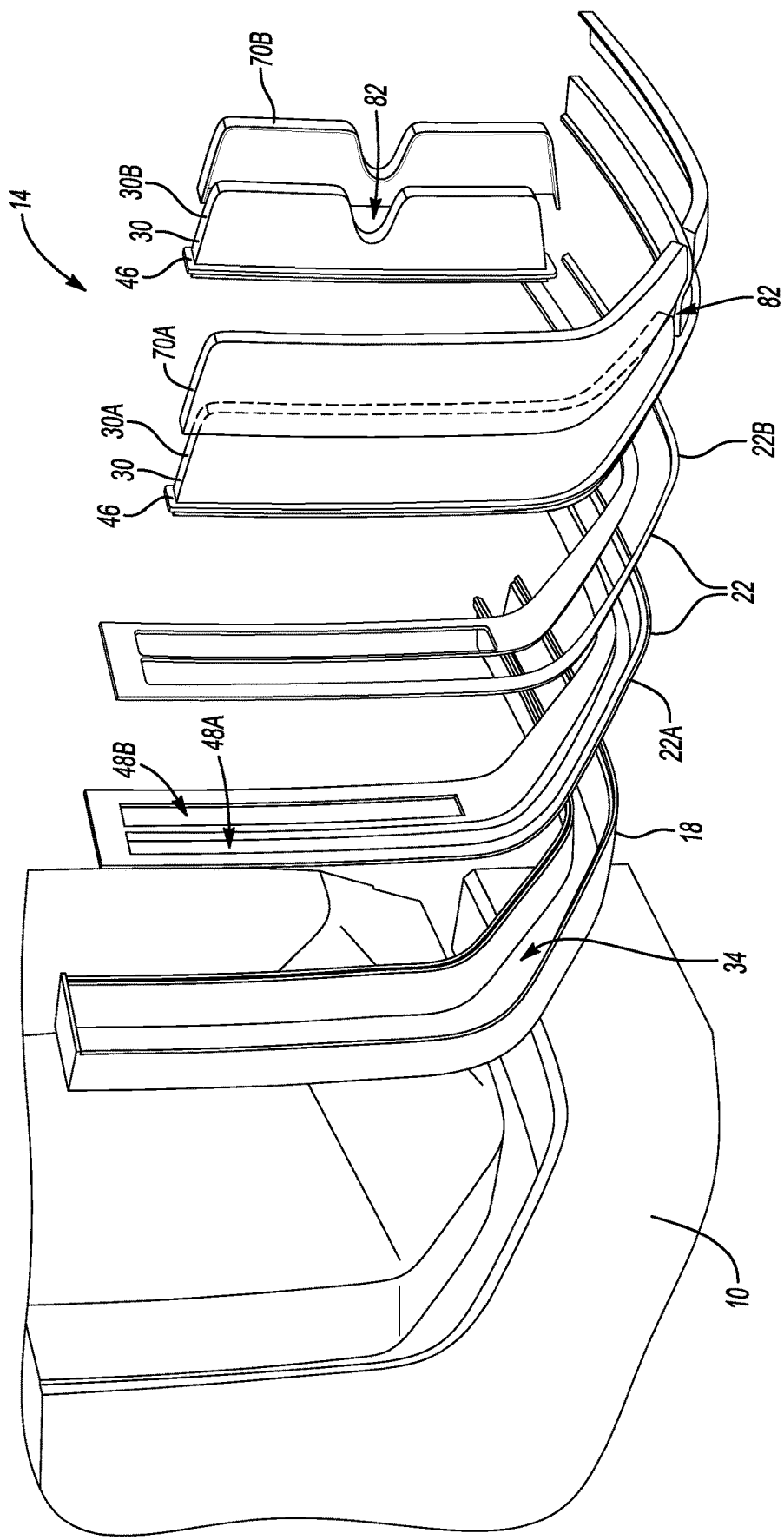
FIG. 3 illustrates an expanded view of selected portions of the lighting assembly of FIG. 2.
Figure 4:
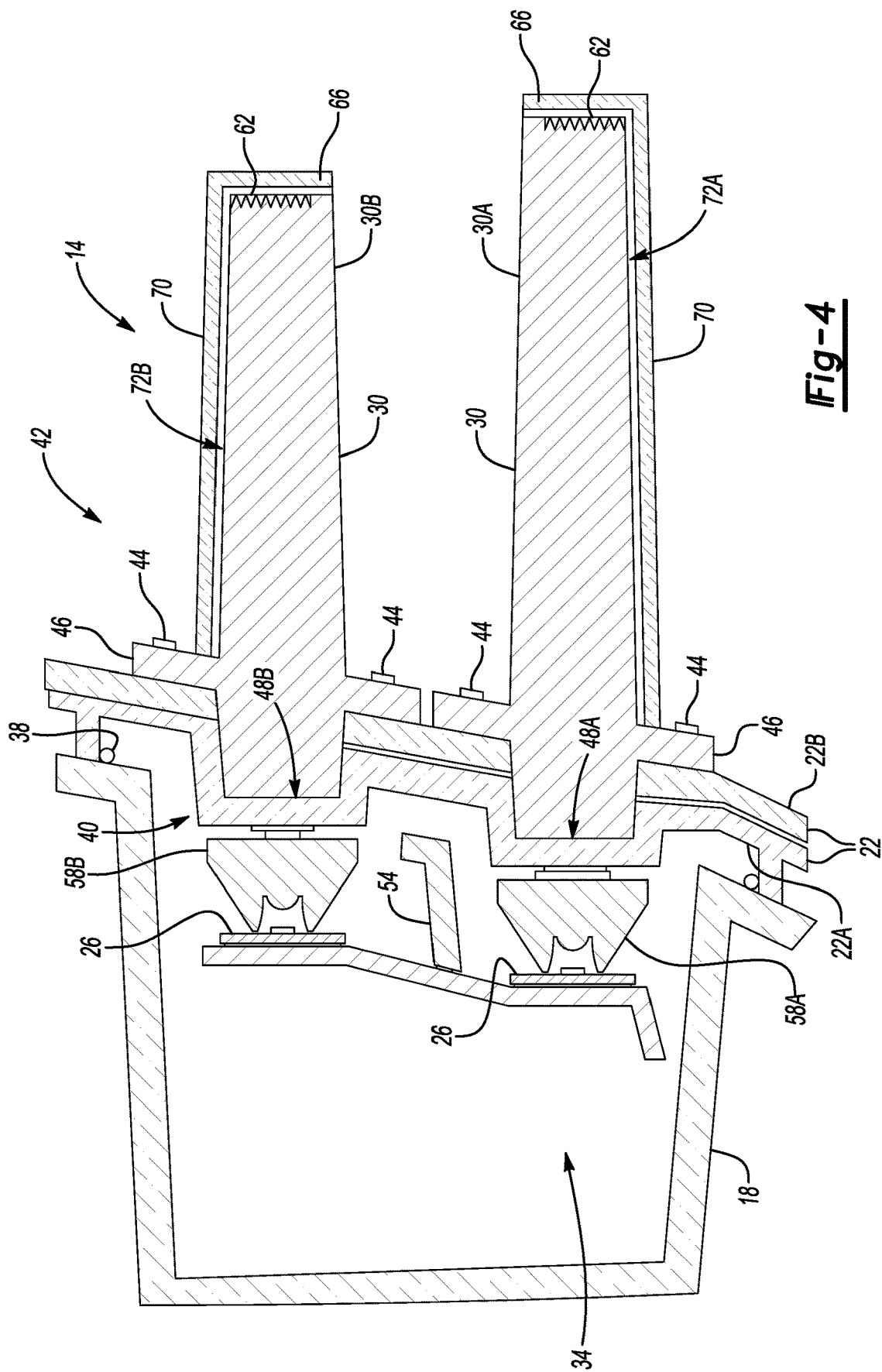
FIG. 4 illustrates a section view taken at line 4-4 in FIG. 2.

With reference now to FIGS. 2-4 and continuing reference to FIG. 1, the lighting assembly 14 includes a light housing 18, a lens 22, at least one light source 26, and at least one light blade 30. The light housing 18 and the lens 22, in this example, provide a cavity 34.

The cavity 34 is a sealed cavity. In this example, a seal 38 is disposed at an interface between the lens 22 and the light housing 18. The seal 38 blocks moisture and contaminants from entering the cavity 34.

The at least one light source 26 is disposed within the cavity 34. In this example, the at least one light source 26 includes two light sources 26A and 26B, which can each be exchangeable Light Emitting Diode modules.

The at least one light blade 30 is outside the cavity 34. In this example, the at least one light blade 30 includes two light blades 30A and 30B.

A plurality of mechanical fasteners 42 removably attached the at least one light blade 30 to the lens 22 in this example. The mechanical fasteners 42 could be threaded fasteners, such as screws. In this example, the at least one light blade 30 includes a collar 44. The mechanical fasteners 42 can extend through apertures in the collar 44 to secure the at least one light blade 30 to the lens 22. The at least one light blade 30 can be replaced by disengaging the mechanical fasteners 42.

The lens 22 includes a recessed area 46A and a recessed area 46B. At least a portion of the light blade 30A is received within the recessed area 46A. At least a portion of the light blade 30B is received within the recessed area 46B. The recessed areas 46A and 46B can, among other things, help to align the respective light blades 30A and 30B relative to the lens 22.

The lens 22 can be a two-shot lens. The first shot provides a clear layer 22A. The second shot provides an opaque layer 22B. Selected areas of the clear layer 22A are left uncovered by the opaque layer 22B. The at least one light blade 30 interfaces with these areas of the clear layer 22A. The opaque layer 22B covers other areas of the clear layer 22A so that light that is emitted from the lens 22 moves to the at least one light blade 30 rather than to the surrounding environment.

The light source 26A is configured to emit light through a portion of the lens 22 into the first light blade 30A. The light source 26B is configured to emit light through another portion of the lens 22 into the second light blade 30B.

The cavity 34 holds a light blocking bezel 54, which is positioned to block at least some of the light emitted from the first light source 26A from moving to the second light blade 30B, and at least some of the light emitted from the second light source 26B from moving to the first light blade 30A.

The cavity 34 holds a first collimator 58A and a second collimator 58B. The first collimator 58A is configured to redirect light emitted from the first light source 26A to the first light blade 30A. The second collimator 58B is configured to redirect light emitted from the second light source 26B to the second light blade 30B.

The at least one light blade 30 projects from the lens 22. As the example lighting assembly 14 is a rear taillight, the at least one light blade 30 projects rearward relative to an orientation of the vehicle 10.

The at least one light blade 30 includes a textured region 62, which can be considered optics of the at least one light blade 30. In this example, the textured region 62 is included along a rearward facing surface 66 of the at least one light blade 30. When the light source 26 is emitting light, an individual viewing a rear of the vehicle 10 would be able to see light emitted through the textured region 62.

In this example, exposed surfaces of the collars 44 of the at least one light blade 30 can be painted to block light from being emitted from the collars 44. The light is instead directed through the at least one light blade 30 toward the textured region 62. In another example, the at least one light blade 30 is formed via a two-shot molding process with one of the shots providing an opaque layer that covers the collars 46 to block light rather than using a painted on layer.

A secondary lens or light blade lens 70 is secured to the at least one light blade 30. The light blade lens 70 can be secured via laser welds, for example. The light blade lens 70 covers at least the textured region 62. In this example, the light blade lens 70 does not cover all areas of the light blade 30 that are projecting from the lens 22. At least a portion of the light blade 30 is exposed and uncovered by the light blade lens 70 or the lens 22.

The example first light blade 30A and the second light blade 30B are polymer-based materials. The first light blade 30A and the second light blade 30B can be different colors to provide a desired lighting effect. In this example, the first light blade 30A is red and the second light blade 30B is yellow.

The at least one light blade 30 focuses and redirects light emitted by the at least one light source 26 within the cavity 34. The at least one light blade 30 distributes and evens out emitted light, which can help to eliminate hot spots of light.

In this example, the first light blade 30A includes a vertically extending portion 74 that curves to transition into a horizontally extending portion 78. The second light blade 30B extends vertically, but not horizontally in this example. The first light blade 30A and the second light blade 30B each include a notch 82. Vertical and horizontal, for purposes of this disclosure, are with reference to ground and an ordinary orientation of the vehicle 10 during operation.

The first light blade 30A and the second light blade 30B can each be selectively illuminated to provide a turn signal, a stop light, a daytime running light, etc.

Some features of the disclosed examples include positioning a light blade outside a sealed cavity of a lighting assembly. This positioning facilitates replacement of the light blade and can aesthetically enhance the lighting assembly. The light blade can provide a three-dimensional illuminated effect.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle lighting assembly, comprising:
   a light housing;
   a lens;
   a light source within a cavity provided by the light housing and the lens; and a light blade projecting from the lens outside the cavity, the light source configured to emit light through the lens that then passes through the lightblade wherein a least a portion of the light blade is received within a recessed area of the lens.

2. The vehicle lighting assembly of claim 1, wherein the light blade is mechanically fastened to the lens.

3. The vehicle lighting assembly of claim 1, wherein cavity is a sealed cavity.

4. The vehicle lighting assembly of claim 1, wherein the light blade is a first light blade, and further comprising a second light blade projecting from the lens outside the cavity.

5. The vehicle lighting assembly of claim 4, wherein the first light blade and the second light blade are different colors.

6. The vehicle lighting assembly of claim 4, wherein the light source is a first light source configured to emit light into the first light blade, and further comprising a second light source within the cavity, the second light source configured to emit light into the second light blade.

7. The vehicle lighting assembly of claim 6, further comprising a light blocking bezel within the cavity, the light blocking bezel configured to block light emitted from the first light source from moving to the second light blade, the light blocking bezel configured to block light emitted from the second light source from moving to the first light blade.

8. The vehicle lighting assembly of claim 1, wherein the light blade includes a textured region.

9. The vehicle lighting assembly of claim 8, wherein the lens is a first lens, and further comprising a second lens that covers at least the textured region.

10. The vehicle lighting assembly of claim 1, wherein at least a portion of the light blade is exposed and uncovered by any lens.

11. The vehicle lighting assembly of claim 1, further comprising a collimator within the cavity, the collimator configured to redirect light from the light source to the light blade.

12. The vehicle lighting assembly of claim 1, wherein the light housing, the light source, and the lens are constituents of a rear taillight assembly of a vehicle, wherein the light blade projects rearward from the lens relative to an orientation of the vehicle.

13. The vehicle lighting assembly of claim 1, wherein the light source is an exchangeable Light Emitting Diode module.

14. The vehicle lighting assembly of claim 1, wherein the light blade includes a vertically extending portion and a horizontally extending portion.

15. A vehicle lighting method, comprising: emitting light from a light source that is inside a cavity provided by a light housing and a lens; and directing the light through a light blade that is outside the cavity wherein the light blade is at least partially received within a recessed area of the lens, the light emitted from the light source passing through the recessed area and then directly through the light blade.

16. The vehicle lighting method of claim 15, wherein the light blade is removably attached to the lens.

17. The vehicle lighting method of claim 15, further comprising emitting light from the light blade through a textured region of the light blade.

18. The vehicle lighting method of claim 15, wherein the light blade extends horizontally from the lens, wherein the light blade includes a vertically extending portion and a horizontally extending portion.

\* \* \* \* \*